United States Patent [19]
Sudau

[11] Patent Number: 6,019,683
[45] Date of Patent: Feb. 1, 2000

[54] TWO PART FLYWHEEL FOR A MOTOR VEHICLE, THE TWO PART FLYWHEEL HAVING A TORSIONAL VIBRATION DAMPER

[75] Inventor: Jörg Sudau, Niederwerrn, Germany

[73] Assignee: Fichtel & Sachs AG, Schweinfurt, Germany

[21] Appl. No.: 08/813,105

[22] Filed: Mar. 7, 1997

[30] Foreign Application Priority Data

Mar. 8, 1996 [DE] Germany ............ 196 09 041

[51] Int. Cl.[7] ...................................... F16D 3/14
[52] U.S. Cl. ................ 464/68; 192/212; 475/347
[58] Field of Search ................. 464/24, 66, 68; 74/574; 192/208, 70.17, 55.4; 475/347, 346

[56] References Cited

U.S. PATENT DOCUMENTS

| | | | |
|---|---|---|---|
| 4,944,712 | 7/1990 | Worner et al. ............. | 74/574 |
| 4,946,420 | 8/1990 | Jackel ..................... | 74/574 |
| 5,533,415 | 7/1996 | Ackermann et al. ......... | 192/212 |
| 5,551,928 | 9/1996 | Sudau ..................... | 74/574 |
| 5,634,866 | 6/1997 | Sudau ..................... | 475/347 |
| 5,733,218 | 3/1998 | Sudau et al. ............. | 74/574 |
| 5,762,577 | 6/1998 | Rohs ...................... | 74/574 |
| 5,766,109 | 6/1998 | Sudau ..................... | 475/347 |

FOREIGN PATENT DOCUMENTS

| | | |
|---|---|---|
| 9414314 | 1/1995 | Germany . |
| 19517605 | 11/1995 | Germany . |
| 7208547 | 8/1995 | Japan . |
| 854045 | 2/1996 | Japan . |
| 2285109 | 6/1995 | United Kingdom . |
| 2290597 | 1/1996 | United Kingdom . |
| 2296072 | 6/1996 | United Kingdom . |

*Primary Examiner*—Eileen Dunn Lillis
*Attorney, Agent, or Firm*—Nils H. Ljungman & Associates

[57] ABSTRACT

A two part flywheel having a torsional vibration damper with a plurality of inertial masses, for installation in the drive train of a motor vehicle. The torsional vibration damper has three inertial mass systems. A first and a second inertial mass system are oriented so that they can rotate jointly and also relative to one another around a common first axis of rotation. The first inertial mass system and the second inertial mass system are connected rotationally elastically to one another by means of a spring system. A third inertial mass system which is movable relative to the first and the second inertial mass systems is rotationally connected by a transmission system to the first and/or second inertial mass systems. One of the inertial mass systems, in particular the first inertial mass system, is designed to be connected to the crankshaft of an internal combustion engine. The inertial mass of the third inertial mass system is defined essentially exclusively by the inertial masses of a plurality of inertial mass bodies which rotate around the first axis of rotation. Each inertial mass body can rotate or pivot around a second axis of rotation which is axially parallel to and offset from the first axis of rotation, and each inertial mass body is driven or pivoted around its second axis of rotation by the transmission system as a function of the relative rotational movement between the first and second inertial mass systems.

20 Claims, 5 Drawing Sheets

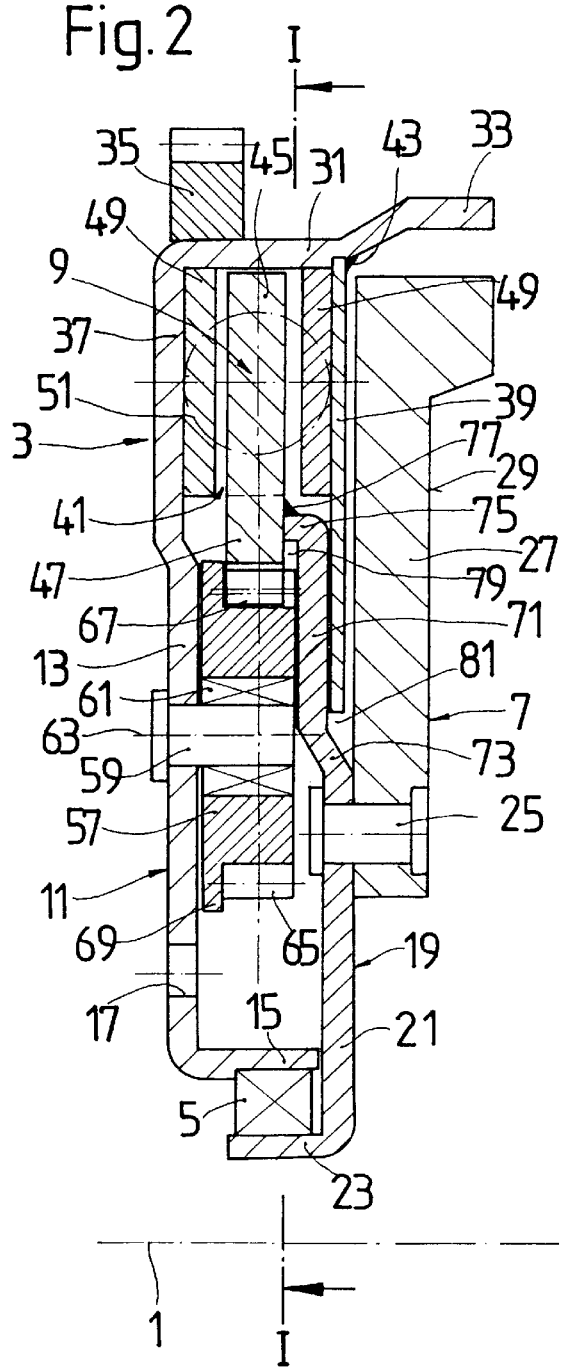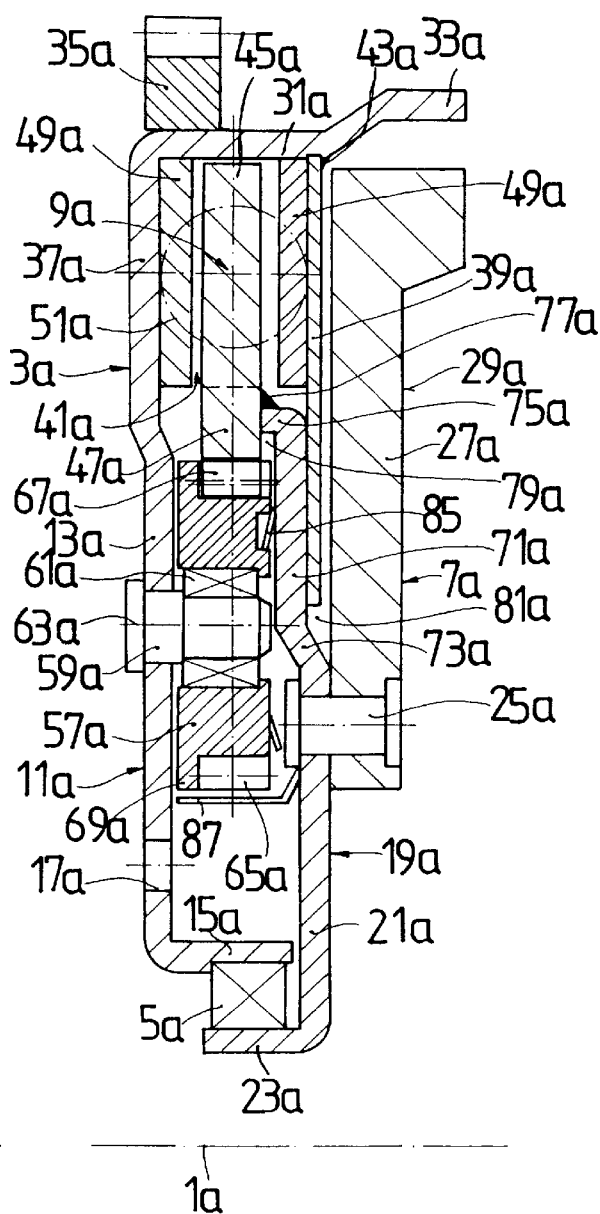

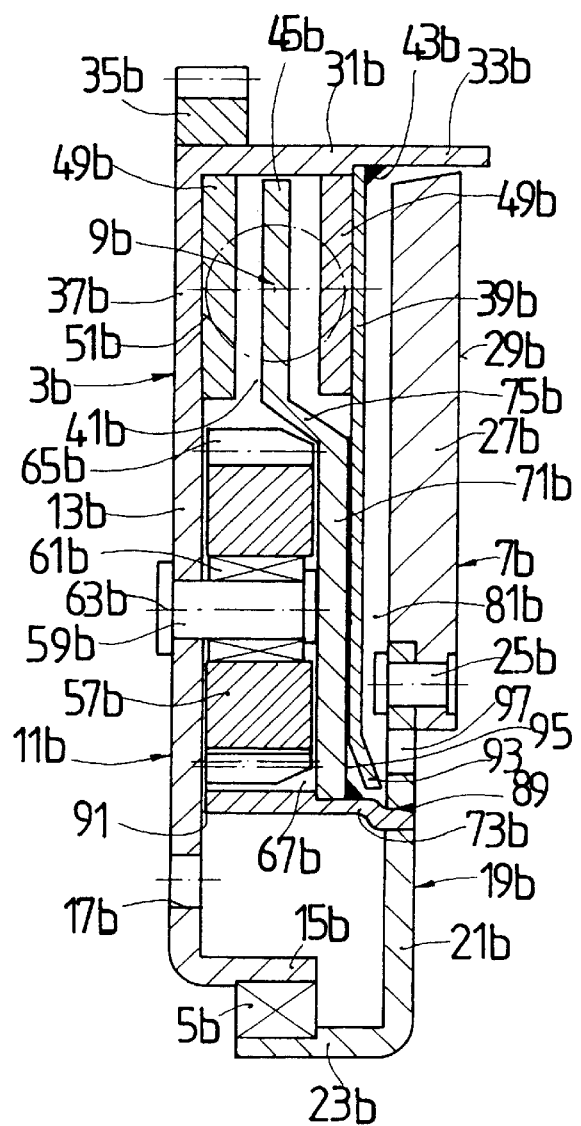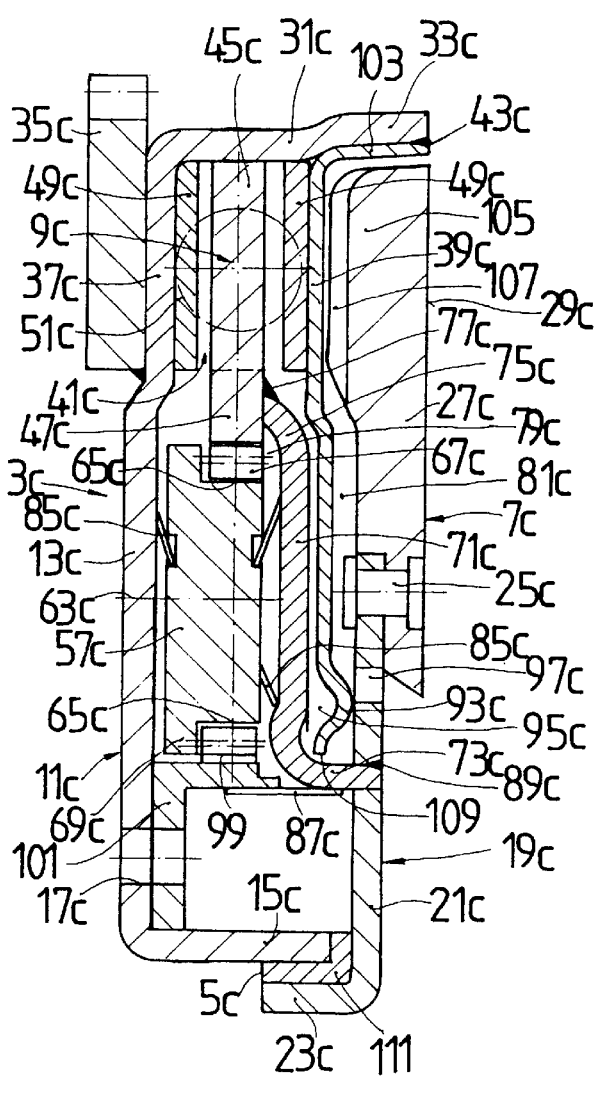

TWO PART FLYWHEEL FOR A MOTOR VEHICLE, THE TWO PART FLYWHEEL HAVING A TORSIONAL VIBRATION DAMPER

BACKGROUND OF THE INVENTION

1. Field of the Invention

The present invention relates generally to a two part flywheel having a torsional vibration damper, in particular for installation in the drive train of a motor vehicle.

2. Background Information

To damp torsional vibrations in the drive train of a motor vehicle, German Utility Model 94 14 314 describes a flywheel which has two inertial masses. A first inertial mass system is fastened to the crankshaft of an internal combustion engine and a second inertial mass system is mounted so that it can rotate on the first inertial mass system and simultaneously form a friction surface of a friction clutch. The two inertial mass systems are connected to one another with rotational elasticity by means of a spring system. There is also a third inertial mass system which can rotate around the common axis of rotation of the two inertial mass systems. The third inertial mass system is in the form of a planet carrier or a ring gear of a planetary gear train. The sun wheel is non-detachably connected to the first inertial mass system and is engaged in the conventional manner with at least one planet wheel. The planet wheel can rotate on the common axis of rotation axially parallel to the planet carrier. To the extent that the planet carrier is used as the third inertial mass, the planet wheels are engaged with the ring gear which is then non-detachably fastened to the second inertial mass system. In embodiments in which the ring gear forms the third inertial mass, the planet carrier of the planetary gear train is a component of the second inertial mass system. Known flywheels which have a plurality of inertial masses are comparatively complex and require a relatively large amount of space in the axial and/or radial direction for the installation of the components of the planetary gear train. Additionally, the mounting of the third inertial mass is difficult because the central area of the system of inertial masses is required for the installation of a number of components of the torsional vibration damper, in particular for the installation of the bearing which is used to mount the second inertial mass system on the first inertial mass system, as well as for the installation of friction devices, if such friction devices are present. The rotational mounting of components such as a ring gear, for example, on a relatively large diameter is also problematic.

An additional flywheel which has multiple inertial masses is described in German Patent No. 195 17 605. On this flywheel, a first inertial mass system is rotationally elastically coupled by means of a spring system with a second inertial mass system. The second inertial mass system is mounted so that it can rotate relative to the first inertial mass system. The first inertial mass system also forms the ring gear of a planetary gear train which is coaxial to the axis of rotation of the crankshaft. The sun wheel of the planetary gear train is rotationally mounted on the crankshaft and is driven by means of the planet wheels which are engaged with the sun wheel and the ring gear. The planet wheels are also mounted on a planet carrier which is non-detachably connected to the engine and rotates in the direction opposite to the direction of rotation of the crankshaft. A third inertial mass which is non-detachably connected to the sun wheel ensures compensation for irregularities in the rotation of the crankshaft.

OBJECT OF THE INVENTION

The object of the present invention is to create a flywheel having a torsional vibration damper which has a plurality of inertial masses, which can be realized more easily and more economically than similar known devices, and which can be kept relatively compact.

SUMMARY OF THE INVENTION

The present invention teaches that in one preferred embodiment, this object can be accomplished by an arrangement in which a first and second inertial mass system are installed so that they can rotate both together and relative to one another around a common first axis of rotation. The first and second inertial mass systems can be rotationally elastically connected to one another by means of a spring system. A third inertial mass system can be movable relative to the first and second inertial mass systems. The third inertial mass system is in a rotational drive connection with the first and/or second inertial mass systems by means of a transmission system. One of the inertial mass systems, in particular the first inertial mass system, is designed to be connected to the crankshaft of an internal combustion engine.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below, with reference to the embodiments illustrated in the accompanying drawings, wherein:

FIG. 2 shows a partial axial longitudinal section through the flywheel with a plurality of inertial masses, viewed along a line II—II in FIG. 1;

FIGS. 3 to 6 show partial longitudinal sections through variants of the flywheel with multiple inertial masses illustrated in FIG. 2.

DESCRIPTION OF THE PREFERRED EMBODIMENT

Figure 1:
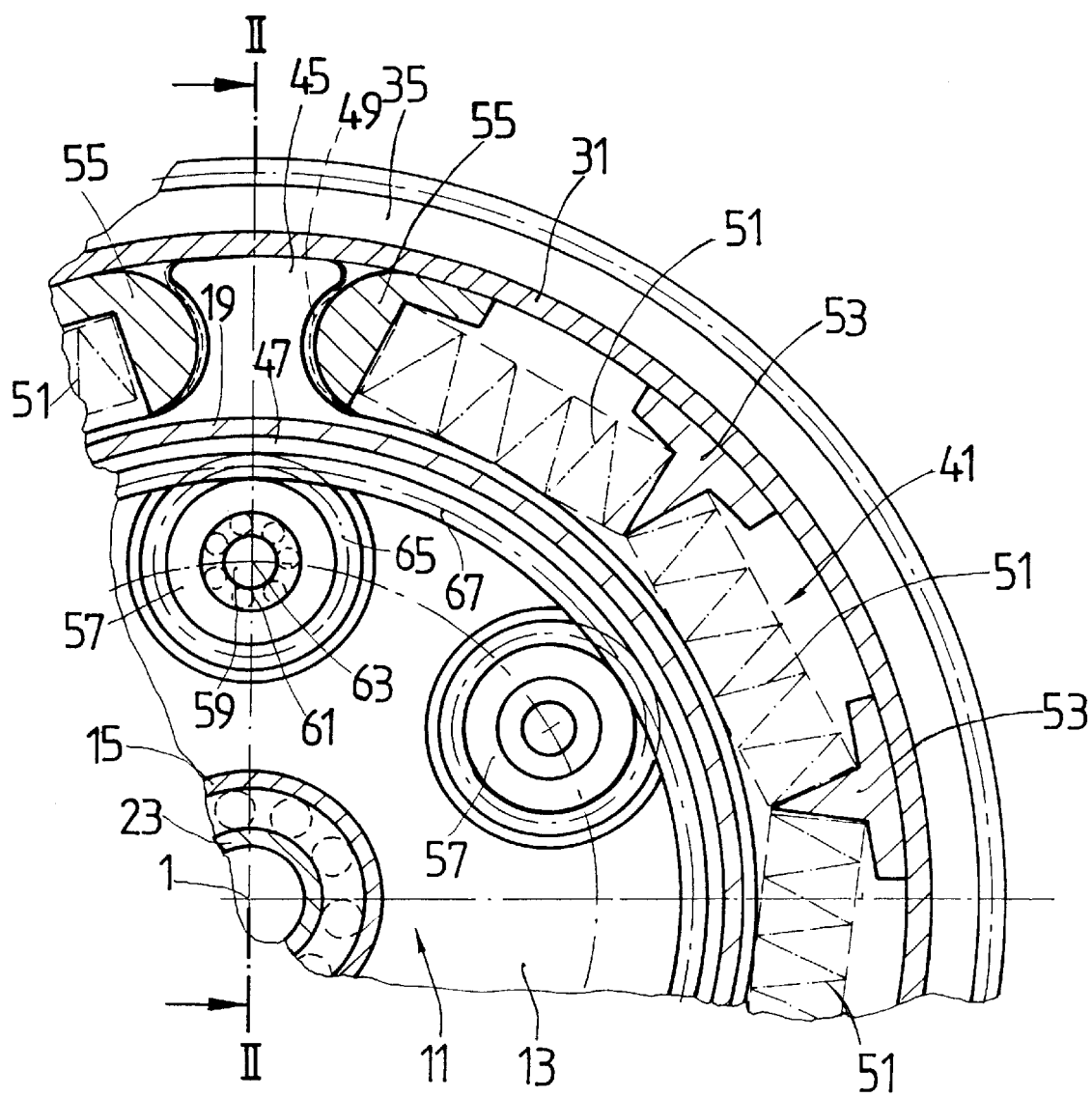
FIG. 1 shows a partial axial cross section through a flywheel which has a plurality of inertial masses, with a torsional vibration damper located in the drive train of a motor vehicle, viewed along a line I—I in FIG. 2.

FIGS. 1 and 2 show detailed illustrations of portions of one-half of a flywheel which has a plurality of inertial masses and is located in the drive train of a motor vehicle. The multiple-mass flywheel can include an inertial mass system 3 which can be fastened concentrically with an axis of rotation 1 on a crankshaft of an internal combustion engine of a motor vehicle. A second inertial mass system 7 can be rotationally mounted equiaxially with the axis of rotation 1, on the inertial mass system 3, by means of a bearing 5, in particular a ball bearing. The inertial mass system 7 can form the carrier for a friction clutch of the drive train and may be connected rotationally elastically to the first inertial mass system 3 by means of a damping spring system 9. The damping spring system 9 can act directly between the two inertial mass systems 3, 7.

The first inertial mass system 3 may include, as the carrier of additional components of the flywheel which has a plurality of inertial masses, a sheet metal structural part 11. The sheet metal structural part 11 can have an annular wall 13 which extends essentially radially in relation to the axis of rotation 1 and is flat, at least in portions. The annular wall 13, on its inside periphery, can support a tubular bearing lug 15 which may project axially and is preferably formed in one piece with the ring wall or annular wall 13. The bearing lug 15 can guide the bearing 5 radially on its outside periphery. The annular wall 13, in the vicinity of the bearing lug 15, can be provided with a plurality of holes 17. The holes 17 may be distributed in the peripheral direction for fastening screws which are not illustrated in any further detail, and the means by which the inertial mass system 3 can be screwed onto a crankshaft which is also not shown, but which would be located on the left in FIG. 2.

The inertial mass system 7 can include a sheet metal structural part 19 which may be in the form of an approximately ring-shaped disc and can be radially engaged with the bearing 5 in a hub area 21. The sheet metal structural part 19 can include a bearing lug 23 which projects axially in the direction opposite to the bearing lug 15. The bearing lug 23 can overlap coaxially with the bearing lug 15, and by means of which the sheet metal structural part 19 is radially guided on the inside periphery of the bearing 5. The bearing lugs 15, 23 can also fix the sheet metal structural parts 11, 19 at least axially in relation to one another. By means of a plurality of rivets 25 distributed in the peripheral direction, a ring-shaped flywheel 27, e.g. made of cast material, may be fastened at a radial distance from the bearing lug 23 on the sheet metal structural part 19. A flat side 29 of the flywheel 27 farther from the crankshaft can also form a friction surface of the friction clutch which is not illustrated in any further detail. The friction clutch can be fastened to the flywheel 27 in the conventional manner.

In the vicinity of the outside periphery of the sheet metal structural part 11, a cylindrical peripheral wall 31 can be formed in one piece with the sheet metal structural part 11. The cylindrical peripheral wall 31 can extend axially, to increase the moment of inertia of the inertial mass system 3. The cylindrical peripheral wall 31 can have an extension 33 which, in one embodiment, may extend axially beyond the flywheel 27. The cylindrical peripheral wall 31 may also carry a non-rotational ring-shaped starter motor ring gear 35. Adjacent to the essentially planar ring wall 13 of the sheet metal structural part 11, radially outwardly, can be a wall area 37, from the outside periphery of which the peripheral wall 31 may project and which, together with the peripheral wall 31 and a top or cover wall 39 which can essentially be in the shape of a ring-shaped disc and can extend at some distance from the wall area 37, can define an approximately ring-shaped chamber 41 which may surround or enclose the axis of rotation 1.

In other words and in accord with one possible embodiment of the present invention, the wall area 37 can be disposed radially inward of the peripheral wall 31 and adjacent to the annular wall 13. The top wall 39 can be disposed radially inward of the peripheral wall 31 and substantially parallel to the wall area 37. The wall area 37, the peripheral wall 31 and the top wall 39 may define three sides of an approximately ring-shaped chamber 41. The ring-shaped chamber 41 is preferably disposed about the axis of rotation 1.

The chamber 41 is preferably sealed tight on the radial outside. The top wall 39 is preferably non-detachably connected in a sealed manner in the vicinity of its outside periphery by a weld seam 43. The top wall 39 can be connected with the sheet metal structural part 11 to form a single unit. Projecting into the chamber 41 can be a plurality of extensions or arms 45 which are offset from one another in the peripheral direction. The arms 45 can project radially outward from a ring 47 which is non-detachably connected, e.g. by welding, to the sheet metal structural part 19. Control plates 49 which may have contours which match the arms 45 can be located axially on both sides of each arm 45. The control plates 49 can be non-detachably connected with the walls which form the chamber 41, e.g. the wall area 37 and the top wall 39. Between arms 45 or control plates 49 which may be next to one another in the peripheral direction, as shown most clearly in FIG. 1, in the channel 41 there can be a plurality of coil compression springs 51 arranged in a row one behind another. Between neighboring coil compression springs 51, sliding blocks 53 may be engaged. The sliding blocks 53 are guided so that they can slide along the inside periphery of the peripheral wall 31. The coil compression springs 51 which are next to the arms 45 may be supported by means of spring shoes 55 on the arms 45 and the control plates 49. The coil compression springs 51 can, although they do not have to, be installed with bias between the arms 45 or control plates 49 which are next to one another in the peripheral direction. When there is a relative rotation of the inertial mass system 7 relative to the inertial mass system 3 around the axis of rotation 1, the coil compression springs 51, which are shown in their rest position in FIG. 1, can each be compressed between an arm 45 and the pair of control plates 49 following it in the peripheral direction. As a result of which the two peripheral mass systems 3,7 can be coupled to one another with rotational elasticity, as is the case in conventional two-mass flywheels in the drive train of a motor vehicle. The torque may thereby be transmitted directly between the sheet metal structural parts 11 and 19.

The inertial mass and the moment of inertia of the first inertial mass system 3 can essentially be defined by the sheet metal structural part 11, the top wall 39, the control plates 49 and the starter ring 35, as well as by some of the coil compression springs 51. The moment of inertia of the second inertial mass system 7 may essentially be defined by the flywheel 27, the sheet metal structural part 19, the ring 47 and the arms 45, as well as by some of the coil compression springs 51, if such springs are present. The inertial masses of the two inertial mass systems 3, 7 together with the damping spring system 9, form a mechanically oscillating system which can make it possible, in a known manner, to filter excitations in the drive train of motor vehicles, or to shift characteristic frequencies into speed ranges in which they do not have any undesirable effects. Because the space which can be used for the installation of the inertial masses is a function both of the size and the shape of the space available in the vehicle, it may frequently be difficult to provide suitable configurations which meet both the space and performance requirements, as well as the requirements set for the oscillating or inertial system.

The torsional vibration damper illustrated in FIGS. 1 and 2, in addition to the inertial masses of the inertial mass systems 3 and 7 which can rotate relative to one another around the axis of rotation 1, may comprise a third inertial mass system which is in the form of a plurality of inertial mass bodies 57 distributed in the peripheral direction. The inertial mass bodies 57 are preferably rotationally or pivotably mounted on journals 59 which can be held firmly in the annular wall 13 of the sheet metal structural part 11 by means of bearings 61, such as ball bearings, needle bearings, or simply coated journals.

In other words, and in accord with one possible embodiment of the present invention, the torsional vibration damper may comprise a third inertial mass system. The third inertial mass system preferably comprises a plurality of inertial mass bodies. The inertial mass bodies 57 can be rotationally mounted on journals 59 by bearings 61. The journals 59 can be attached to the annular wall 13 of the sheet metal structural part 11.

The inertial mass bodies 57 can be provided on a peripheral area with teeth 65 which are preferably formed in one piece on a ring 47 and which, together with mating teeth 67, jointly surrounds the inertial mass bodies 57 on the side farther from the axis of rotation 1.

In other words and in accord with one possible embodiment of the present invention the inertial mass bodies 57 can have a peripheral area which may include teeth 65. The ring 47 can include mating teeth 67 which can mesh with the teeth 65 of the inertial mass bodies 57. The meshing of the teeth 65 and the mating teeth 67 preferably occurs at the radially outer side of the inertial mass bodies 57.

In the event of a relative rotation of the inertial mass systems 3, 7, the inertial mass bodies 57 are driven in rotation around the axis of rotation 63 by the teeth 65, 67 which form a transmission. The inertial mass of the inertial mass bodies 57 can thereby influence the oscillation or inertial behavior of the inertial mass systems 3, 7 which may be coupled to one another with rotational elasticity by means of the spring system 9, utilizing the space available between the sheet metal structural parts 11, 19. Because the inertial mass bodies 57 represent the only inertial masses which are driven by the teeth 65, 67, a relatively large mass with the simplest possible construction can be created, which makes it possible to vary the oscillation or inertial characteristics within a wide range.

In the illustrated embodiment of FIGS. 1 and 2, the teeth 65 can extend over essentially the entire peripheral surface of each inertial mass body 57, to take into consideration even large relative angles of rotation between the inertial mass systems 3, 7. The axial width of the teeth 65, however, can correspond essentially only to the axial width of the mating teeth 67. To increase the inertial mass, the teeth 65 are preferably closed on the flat side next to the sheet metal structural part 11, and as shown at 69, the area of the material of the inertial mass body 57 projects both axially and radially beyond the contour of the teeth 65. The inertial mass bodies 57 also have end surfaces which are preferably perpendicular to the axis of rotation 1. The inertial mass bodies 57 can be axially fixed in position between the annular wall area 13 of the sheet metal structural part 11, which annular wall area 13 extends radially over the entire diameter of the inertial mass body 57, on the one hand, and an annular wall area 71 of the sheet metal structural part 19, which annular wall area 71 may extend in a plane perpendicular to the axis of rotation 1. The annular wall 71 of the sheet metal structural part 19, in the vicinity of the journal 59, can make a transition into an annular web 73 in the hub area 21. The annular wall 71 of the sheet metal structural part 19 is preferably bent downward on its outside periphery at an angle 75 toward the ring 47, where it can be welded along a weld seam 77 which preferably runs radially outside the mating teeth 67.

The chamber 41 can be filled at least partly, but at least up to the vicinity of the coil compression springs 51, with a viscous medium such as grease. The grease which, in addition to its lubrication action, performs a certain damping action on account of the components which can move relative to one another in the chamber 41. The amount of grease used can be the amount which is sufficient for the lubrication of the teeth 65, 67, but it can also extend at least partly to the inside periphery of the ring 47.

In another possible embodiment of the present invention the amount of grease used may be sufficient to lubricate the teeth 65, 67 and to allow some of the grease to escape to a space that may be disposed next to the ring 47. Further, the amount of grease used may be sufficient to lubricate the teeth 65, 67 and to partially fill the chamber 41.

The chamber 41, toward the radial outside, is preferably sealed so that it remains tight even under the pressure of the grease caused by centrifugal force. Toward the radial inside, the quality requirements set for the seal of the chamber 41 can be significantly less stringent, and in the extreme case, on account of the consistency of the grease, it may be possible to dispense with the seal altogether. In the illustrated embodiment of FIGS. 1 and 2, the seal of the bearing 5, which may be required in any case, seals the area between the sheet metal structural parts 11, 19 on the radial inside. The inertial mass bodies 57 which can be in contact by means of their flat end surfaces against the planar annular walls 13, 71, can define the cross section for the passage of the grease from the chamber 41 to the bearing 5 and prevent the rolling movement of the teeth 65, 67 from transporting grease directly from the chamber 41 into the vicinity of the bearing 5. In particular, the material areas 69 which close or enclose the tooth 65 axially can prevent the rolling movement from pressing grease out of the teeth directly into the space between the annular wall 13 and the inertial mass bodies 57. Between the annular wall 71 and the inertial mass bodies 57, next to the engagement area of the teeth 65, 67, there is preferably an annular space 79 which can also hold the grease which has been squeezed out of the teeth. Otherwise, the chamber 41, on the side of the flywheel 27, is preferably sealed relative to the sheet metal structural part 19 by the top wall 39. The top wall 39 can project into an annular space 81 defined between the annular wall 71 and the flywheel 27 by the annular web 73. The top wall 39 may overlap with the outside of the planar annular wall 71, forming a gap seal essentially over the entire radial height of the annular wall 71. The top wall 39 can also form a contacting seal with the annular wall 71. The moment of friction of the contacting seal can also be used, if necessary, to generate a basic friction of the torsional vibration damper.

The following description relates to variants of the flywheel which has a plurality of inertial masses as described in FIGS. 1 and 2. Components which correspond to those described above in terms of their construction and function are identified by the same reference numbers as in FIGS. 1 and 2, but they are also provided with a letter for more specific identification. Reference is hereby made to the entire preceding description for components not specifically discussed herebelow.

The flywheel which has a plurality of inertial masses and is illustrated in FIG. 3 differs from the embodiment illustrated in FIGS. 1 and 2 essentially in that between the end surface of each of the inertial mass bodies 57a and at least one of the axially neighboring annular walls 13a and 71a, in this case the annular wall 71a of the sheet metal structural part 19a, an axially acting spring 85, in this case a plate spring, is clamped. The plate spring 85 can compensate for any axial play of the inertial mass body 57a which may be present. The plate spring 85 may cause a frictional damping between the inertial mass body 57a and at least one of the sheet metal structural parts 11a, 19a. The friction device thereby created can be sized or designed for the basic friction of the torsional vibration damper, although it can also be sized for the load damping. The friction pair need not be defined directly between the materials of the inertial mass bodies 57a on the one hand and the sheet metal structural parts 11a, 19a on the other hand. If necessary, additional friction rings and thrust collars or similar devices (not shown) can also be located between these components.

In the embodiment illustrated in FIGS. 1 and 2, the seal of the two sheet metal structural parts 11, 19 can be created by the seal of the bearing 5, which seal is not shown in any additional detail. In the embodiment illustrated in FIG. 3, on the other hand, in addition to, or as an alternative to the seal of the bearing 5a, there can also be a sleeve-shaped sealing plate 87 which is preferably held by means of the rivet 25a in the sheet metal structural part 19a. The sleeve-shaped sealing plate 87 can extend axially on the side of the inertial mass bodies 57a facing the axis of rotation 1a between the sheet metal structural parts 11a and 19a. The sleeve-shaped sealing plate 87 can form a gap seal with the sheet metal structural part 11a, but it can also be used to form a dynamic seal.

In the embodiments illustrated in FIGS. 1 to 3, the mating teeth 67, 67a which can be engaged with the teeth 65, 65a on the inertial mass bodies 57, 57a can also be located on the side of the inertial mass bodies 57, 57a which preferably faces radially away from the axis of rotation 1, 1a. This configuration results in a relatively large angular acceleration of the inertial mass bodies 57, 57a as well as a relatively large angle of rotation of the inertial mass bodies 57, 57a. In the embodiment illustrated in FIG. 4, the mating tooth 67b which can be engaged with the teeth 65b of the inertial mass bodies 57b is preferably located on the side of the inertial mass bodies 57b which faces the axis of rotation 1b to reduce the angular acceleration of the inertial mass bodies 57b and the maximum angle of rotation of the inertial mass bodies 57b. In the illustrated embodiment of FIG. 4, an annular web 73b which can connect the annular wall 71b and which can extend perpendicular to the axis of rotation 1b with the hub area 21b of the sheet metal structural part 19b is preferably realized in the form of a sleeve, bush or bushing. The annular web 73b can be concentric to the axis of rotation 1b and can be provided with the mating tooth 67b. The annular web or sleeve 73b can be a sheet metal part in which the mating tooth 67b is formed. The mating tooth 67b can also be realized in the form of a toothed ring or gear ring which is manufactured separately.

The sleeve 73b can be welded at 89 to the hub area 21b of the sheet metal structural part 19b. The sleeve 73b can extend to form a gap seal 91, close to the sheet metal structural part 11b. Instead of the gap seal 91 a contacting dynamic seal can also be provided. The bearing 5b is once again sealed.

In contrast to the embodiment illustrated in FIGS. 1 to 3, FIG. 4 illustrates that the arms 45b can be formed in one piece with the bent portion 75b. The bent portion 75b is preferably adjacent to the radially outer area of the annular wall 71b.

The top wall 39b, in the vicinity of its inside periphery, can be provided with a ring-shaped bent portion 93, which in the area between the annular wall 71b and the top wall 39b can form an annular gap 95. The annular gap 95 may expand conically toward the radial inside. The annular gap 95 can be adjacent to the sealing gap which may be left between the annular wall 71b and the top wall 39b. The annular gap 95 can relieve the pressure on the grease which, under certain circumstances, is discharged from this gap, and thus improve the sealing action.

The rivets 25b can be located on the side of the sleeve-shaped annular web 73b which is farther from the axis of rotation 1b. Radially between the flywheel 27b and the area of the annular web 73b there can be a plurality of openings 97 of sheet metal structural part 19b which openings 97 can be distributed in the peripheral direction. The openings 97 make it possible for cooling air to flow radially outward through the annular gap 81b. The annular gap 81b is open on the radial outside to cool the flywheel 27b and the damping spring system 9b. The top wall 39b, with its bent portion 93, can extend radially beyond the openings 97 and simultaneously can ensure a deflection of the cooling air current which enters the axial openings 97 to the radial annular gap 81b.

The inertial mass bodies 57b can be provided with increased mass, as indicated at 69 in FIG. 2. There can also be friction devices, such as those explained in connection with the spring 85 with reference to the embodiment illustrated in FIG. 3.

In the embodiments explained above, the inertial mass bodies 57, 57a, 57b are preferably fixed in position in a stationary but rotational manner on the crankshaft-side sheet metal structural part 11, 11a, 11b by means of journals or similar devices 59, 59a, 59b. In the embodiment illustrated in FIG. 5, the inertial mass bodies 57c are preferably in the form of roller bodies. The inertial mass bodies 57c can circulate around the axis of rotation 1c without a stationary positioning of their axis of rotation 63c relative to the two sheet metal structural parts 11c, 19c. Each inertial mass body 57c can rotate around their respective axes of rotation 63c. The inertial mass bodies 57c can be guided radially between the mating teeth 67c provided on the ring 47c of the sheet metal structural part 19c and engaged with the radially outer areas of the teeth 65c on one hand, and an additional mating teeth 99 on the other hand. The additional mating teeth 99 can be provided on a gearing carrier 101. The gearing carrier 101 can concentrically surround the axis of rotation 1c and, in operation, can be non-detachably connected to the sheet metal structural part 11c. To axially fix the inertial mass bodies 57c in position, there can be axially acting springs 85c, for example plate springs. The plate springs 85c can also be used to generate a friction moment, as was explained above with reference to FIG. 3. One or, if necessary, both, springs 85c can also be omitted.

One of the two mating teeth 67c or 99 can be omitted if a guide track is formed in one piece on the ring 47c or on the carrier 101. The inertial mass bodies 57c can roll over said guide track while maintaining a uniform distance from the axis of rotation 1c.

Another difference illustrated in FIG. 5 from the embodiment illustrated in FIG. 4 is the configuration of the top wall 39c. The top wall 39c on its radially outer end can be provided with a bent portion 103. The bent portion 103 can follow the extension 33c of the first sheet metal structural part 11c, to increase the moment of inertia of the first inertial mass system 3c. The weld seam 43c can encircle, connect and seal the end surfaces of the extension 33c and the bent portion 103. In the radially inner area, the top wall 39c can be provided with a bead 93c which encircles the axis of rotation 1c in the manner of a ring. The bead 93c can project in a curved manner toward the hub area 21c of the sheet metal structural part 19c. Together with the annular wall 71c, the radially outer wall area of the bead 93c forms a wedge-shaped annular gap 95c which becomes wider radially inward.

In another possible embodiment of the present invention, the bead 93c and the annular wall 71c can form a wedge-shaped annular gap 95c. The annular gap 95c can become axially wider in the portion of the curve of the bead 93c closest to the hub area 21c.

As explained with reference to FIG. 4 for the bent portion 93, the purpose of this configuration in FIG. 5 is to improve the seal of any annular gap which may remain between the annular wall 71c and the top wall 39c. Another purpose of the configuration in FIG. 5 can be to facilitate a deflection of the cooling air stream which enters through openings 97c of the hub area 21c toward the annular gap 81c. In the radially outer area, the flywheel 27c can have a thicker portion 105 with radial grooves 107 designed to transport cooling air. The thicker portion 105 can project toward the top wall 39c to increase the inertial mass of the flywheel 27c.

At 109, the radially inner edge of the top wall 39c forms a dynamic seal with the sheet metal structural part 19c in the vicinity of the annular web 73c. In the vicinity of the annular web 73c, an additional sealing sleeve 87c which is elastic in the radial direction can ensure a dynamic seal toward the gearing carrier 101.

In the embodiments illustrated in FIGS. 1 to 4, the bearing 5, 5a, 5b which guides the two inertial masses rotationally in relation to one another is realized in the form of a roller bearing, in particular an axially sealed roller bearing. In the embodiment illustrated in FIG. 5, the bearing 5c can be realized in the form of a plain bearing and can comprise a bearing ring 111, which bearing ring 111 has an L-shaped cross section. The bearing ring 111 can guide the two sheet metal structural parts 11c and 19c radially in relation to one another and fix the two sheet metal structural parts 11c and 19c axially in position in relation to one another. The plastic used can include a conventional, e.g. sintered, bearing material. Coatings which have favorable temperature and frictional characteristics can also be used. The plain bearings can also be replaced by a roller bearing, and likewise the roller bearings in FIGS. 1 to 4 can also be realized in the form of plain bearings.

Figure 6:
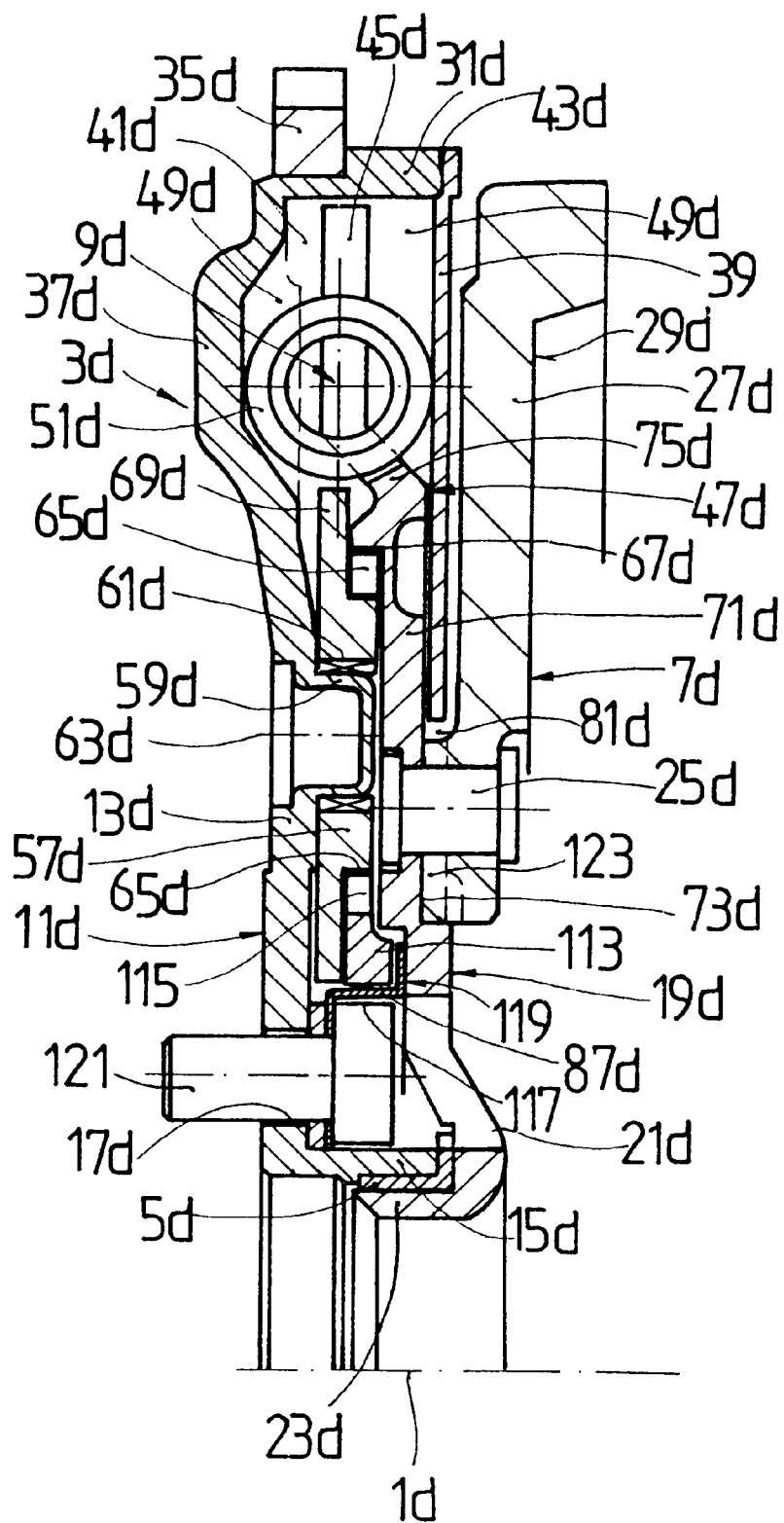

FIG. 6 illustrates a variant of a flywheel which has a plurality of inertial masses, and which differs from the embodiments described above primarily as a result of the presence of an additional, ring-shaped inertial mass component 113. The inertial mass component 113 can be rotationally driven around the axis of rotation 1d by the inertial mass bodies 57d in the manner of a transmission or drive chain. The inertial mass component 113 surrounds the axis of rotation 1d and is engaged with a teeth 115, which teeth 115 is provided on the outside periphery of inertial mass component 113, in the teeth 65d of each individual inertial mass body 57d. The teeth 65d can also be engaged with the mating teeth 67d of the sheet metal structural part 19d. While the mating teeth 67d surrounds the inertial mass bodies 57d in a ring fashion on the side which faces radially away from the axis of rotation 1d, the inertial mass component 113 is located on the side which is preferably radially closer to the axis of rotation 1d. In the event of relative rotation of the two inertial mass systems 3d, 7d, the inertial mass bodies 57d which can rotate on journals 59d around corresponding respective axes of rotation 63d act as "intermediate gear wheels" which can drive the ring-shaped inertial mass component 113 in rotation.

In another possible embodiment of the present invention the inertial mass component 113 can have an outer periphery with teeth 115. The teeth 115 of the inertial mass component 113 can engage the teeth 65d of the inertial mass bodies 57d. The teeth 65d of the inertial mass bodies 57d may also engage mating teeth 67d on the sheet metal structural part 19d. The inertial mass component 113 is preferably located on the radial inside of the inertial mass bodies 57d.

While in the embodiments illustrated in FIGS. 1 to 4 explained above, the journals are realized in the form of separate components which are inserted in sheet metal structural parts of the first inertial mass system, the journals 59d are stamped out of the sheet metal structural part 11d. The inertial mass bodies 57d are mounted by means of plain bearing bushes 61d on these journals 59d.

The ring-shaped inertial mass component 113 is guided in a floating manner between axial and radially neighboring components, and is guided radially in particular by the number of inertial mass bodies 57d which are offset from one another in the peripheral direction. In addition to or instead of the guidance by the teeth 65d, the inertial mass component 113 can also be guided radially on an essentially axially-extending peripheral wall 117 of a ring-shaped sheet metal sealing part 119, and which together with the sheet metal structural part 19d forms a dynamic seal which can be placed under a slight application pressure, if necessary, and is also bolted, together with the sheet metal structural part 11d, to the crankshaft by means of crankshaft fastening bolts 121 which project through the fastening holes 17d of the sheet metal structural part 11d.

As also illustrated in FIG. 6, the inertial mass bodies 57d, axially to one side of their teeth 65d, to increase their moment of inertia, have a radially projecting ring flange 69d which extends radially beyond the teeth 115 of the inertial mass component 113. In this manner, a very high moment of inertia can be achieved in a relatively small space.

Figure 6A:
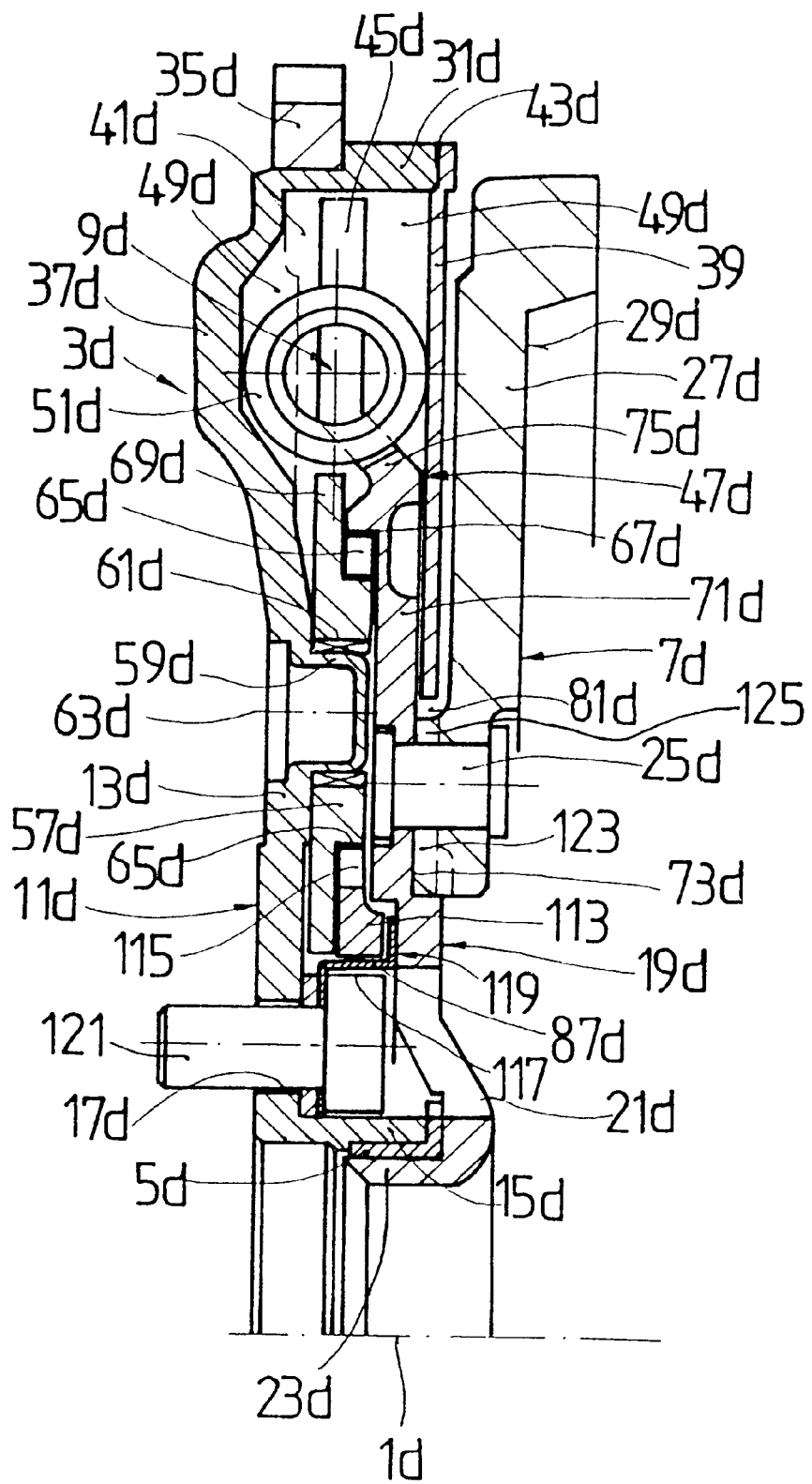
FIG. 6a illustrates additional features of the flywheel depicted in FIG. 6.

In contrast to the embodiments described above, in which the annular web is formed by a Z-shaped bending of the sheet metal structural part 19d, the annular web 73d in FIG. 6 is created by stamping a step, which reduces the cross section of the material. The flywheel 27d is provided in the vicinity of the rivets with a number of ribs 125 (see FIG. 6a) which project radially, and which form cooling air channels 123 which run radially between the ribs 125 and the sheet metal structural part 19d, and which connect the area of the inside periphery of the flywheel 27d with the annular gap 81d which leads radially outward.

In variants of the embodiment illustrated in FIG. 6, the inertial mass component 113 can also surround the inertial mass bodies 57d on the radial outside, in which case, as in the embodiment illustrated in FIG. 4, the mating teeth 67d are located on the side facing the axis of rotation 1d. Here again, however, the inertial mass component is located axially between the two sheet metal structural parts 11d, 19d.

One feature of the invention resides broadly in the torsional vibration damper, in particular for installation in the drive train of a motor vehicle, comprising three inertial mass systems 3, 7, 57, a first 3 and a second 7 inertial mass system are oriented so that they can rotate jointly and also relative to one another around a common first axis of rotation 1, and are connected rotationally and elastically to one another by means of a spring system 9, and a third inertial mass system 57 which is movable relative to the first 3 and the second 7 inertial mass systems and is rotationally connected by means of a transmission system 65, 57 to the first 3 and/or second 7 inertial mass system, whereby one of the inertial mass systems, in particular the first inertial mass system 3, is designed to be connected to the crankshaft of an internal combustion engine, characterized by the fact that the inertial mass of the third inertial mass system is determined essentially exclusively by inertial masses of a plurality of inertial mass bodies 57 which rotate around the first axis of rotation 1, whereby each inertial mass body can rotate or pivot around a second axis of rotation 63 which is axially parallel to and offset from the first axis of rotation 1, and each inertial mass body 57 is driven or pivoted around its second axis of rotation 63 by the transmission system 65, 67 as a function of the relative rotational movement between the first 3 and second 7 inertial mass systems.

Another feature of the invention resides broadly in the torsional vibration damper characterized by the fact that the inertial mass bodies 57, 57a, 57b, at least on a portion of their periphery, are provided with teeth 65, 65a, 65b which is concentric to the corresponding second axis of rotation 63, 63a, 63b and are mounted relative to the first inertial mass system 3, 3a, 3b in a stationary manner on the first inertial mass system, and that the second inertial mass system 7, 7a, 7b comprises a mating teeth 67, 67a, 67b which is concentric to the first axis of rotation 1, 1a, 1b and is engaged with the teeth 65, 65a, 65b.

Yet another feature of the invention resides broadly in the torsional vibration damper characterized by the fact that the mating teeth 67, 67a, 67b is provided exclusively on the side of the inertial mass bodies 57, 57a which faces radially away from the first axis of rotation 1, 1a, or exclusively on the side of the inertial mass bodies 57b which faces radially toward the first axis of rotation 1b.

Still another feature of the invention resides broadly in the torsional vibration damper characterized by the fact that the inertial mass bodies 57, 57a, 57b are mounted on journals 59, 59a, 59b which are non-detachably connected to the first inertial mass system 3, 3a, 3b.

A further feature of the invention resides broadly in the torsional vibration damper characterized by the fact that there is a fourth inertial mass system 113 which can rotate around the first axis of rotation 1d relative to the first 3d and the second 7d inertial mass systems, which fourth inertial mass system 113 is in a rotational drive connection via an additional transmission system 65d, 115 with at least one of the inertial mass bodies 57d, and can be driven so that it rotates or pivots around the first axis of rotation 1d as a function of the relative movement between the inertial mass bodies 57d on one hand and the first 3d and the second 7d inertial mass systems on the other hand.

Another feature of the invention resides broadly in the torsional vibration damper characterized by the fact that at least the one inertial mass body 57d and in particular each of the inertial mass bodies 57d are provided at least over a portion of the periphery with teeth 65d which are concentric to the corresponding second axis of rotation 63d and that the fourth inertial mass system comprises, a ring-shaped inertial mass component 113 which can rotate relative to the first 3d and the second 7d inertial mass system around the first axis of rotation. To form an additional transmission system, the inertial mass component 113 can have mating teeth 115 which are concentric to the first axis of rotation id and engages with the teeth 65d.

Yet another feature of the invention resides broadly in the torsional vibration damper characterized by the fact that the teeth of at least one inertial mass body 57d is engaged on diametrically opposite sides of the second axis of rotation 63d with mating teeth 67d, 115 of the transmission system and of the additional transmission system.

Still another feature of the invention resides broadly in the torsional vibration damper characterized by the fact that the mating teeth 115 of the ring-shaped inertial mass component 113 is engaged in the teeth 65d of the inertial mass body 57d on the side of each inertial mass body 57d next to the first axis of rotation 1d.

A further feature of the invention resides broadly in the torsional vibration damper characterized by the fact that the ring-shaped inertial mass component 113 is guided radially on an annular shoulder 117 which is connected to one of the inertial mass systems, in particular the first inertial mass system 3d, and/or on the teeth 65d of a plurality of inertial mass bodies 57d offset in the peripheral direction around the first axis of rotation 1d.

Another feature of the invention resides broadly in the torsional vibration damper characterized by the fact that the annular shoulder 117 is provided on a ring-shaped sheet metal structural part 119, in particular on a sheet metal structural part which is used to form a dynamic seal and which is non-detachably fastened to the first inertial mass system 3d.

Yet another feature of the invention resides broadly in the torsional vibration damper characterized by the fact that the inertial mass bodies 57d extend radially beyond the mating teeth 115 of the ring-shaped inertial mass component 113.

Still another feature of the invention resides broadly in the torsional vibration damper characterized by the fact that the inertial mass bodies 57c are realized in the form of rolling bodies, and are provided over at least a portion of the periphery with teeth 65c which is concentric to the corresponding second axis of rotation 63c, and that the first inertial mass system 3c comprises a guide track 99 which is concentric to the first axis of rotation 1c for the inertial mass bodies 57c and the second inertial mass system 7c comprises mating teeth 67c which is concentric to the first axis of rotation 1c and is engaged with the teeth 65c of the inertial mass bodies 57c, whereby the guide track 99 and the mating teeth 67c guide the inertial mass bodies 57c radially.

A further feature of the invention resides broadly in the torsional vibration damper characterized by the fact that the mating teeth 67c of the second inertial mass system 7c is engaged on the side of the inertial mass bodies 57c which faces radially away from the first axis of rotation 1c with the teeth 65c of the inertial mass bodies 57c.

Another feature of the invention resides broadly in the torsional vibration damper characterized by the fact that the guide track is also realized in the form of mating teeth 99 which can be engaged with the teeth 65c.

Yet another feature of the invention resides broadly in the torsional vibration damper characterized by the fact that the inertial mass bodies 57, 57a, 57c, for the rotational drive connection to the first 3, 3a, 3c or the second 7, 7a, 7c inertial mass system have, at least over a portion of their periphery, teeth 65, 65a, 65c which is concentric to the corresponding second axis of rotation 63, 63a, 63c and also have material areas 69, 69a, 69c which project radially outward and/or axially beyond the teeth 65, 65a, 65c to increase the inertial mass.

Still another feature of the invention resides broadly in the torsional vibration damper characterized by the fact that the first 3 or the second 7 inertial mass system, but in particular the first inertial mass system 3, has a first sheet metal structural part 11 with a first planar annular wall 13 which runs essentially radially in relation to the first axis of rotation, and an at least approximately ring-shaped chamber 41 located in the radially outer area of the first sheet metal structural part 11 which surrounds the first axis of rotation 1 essentially concentrically to contain at least one spring 51 of the spring system 9, which spring 51 is connected to the first sheet metal structural part 11, that the other 7 of these two inertial mass systems 3, 7 has a second sheet metal structural part 19 which is coupled in the chamber 41 with the spring 51, which sheet metal structural part 19, with a second planar annular wall 71, is opposite and at some distance of the first annular wall 13, which second annular wall 71 runs essentially radially in relation to the first axis of rotation 1, and that the inertial mass bodies 57 are located axially between the radially running annular walls 13, 71 of the sheet metal structural parts 11, 19, and the chamber 41 surrounds all the inertial mass bodies 57 on the radial outside.

A further feature of the invention resides broadly in the torsional vibration damper characterized by the fact that the chamber 41 is realized at least radially outward in a sealed manner to hold a viscous medium, and the first 13 and/or the second 71 annular wall, at least in an area radially next to the chamber 41, runs axially close to one axial end surface of the inertial mass bodies 57.

Another feature of the invention resides broadly in the torsional vibration damper characterized by the fact that the inertial mass bodies 57, 57a, 57c, at least over a portion of their periphery, are provided with teeth 65, 65a, 65c concentric to the corresponding second axis of rotation 63, 63a, 63c, and one of the sheet metal structural parts 11, 11a, 11c, 19, 19a, 19c, in particular the second sheet metal structural part 19, 19a, 19c is provided with a mating teeth 67, 67a, 67c which is engaged with the tooth 65, 65a, 65c and is concentric to the first axis of rotation 1, 1a, 1c, and that the annular wall 71, 71a, 71c of the sheet metal structural part 19, 19a, 19c comprising the mating teeth 67, 67a, 67c makes a transition, forming a radially open annular pocket 79, 79a, 79c into an annular area 47, 47a, 47c of the sheet metal structural part 19, 19a, 19c which contains the mating teeth 67, 67a, 67c.

Yet another feature of the invention resides broadly in the torsional vibration damper characterized by the fact that the ring area 47, 47a, 47c is realized in the form of an annular disc provided with the mating teeth 67, 67a, 67c, and is held, in particular by welding, on a disc part of the sheet metal structural part 19, 19a, 19c, which disc part forms the annular wall 71, 71a, 71c.

Still another feature of the invention resides broadly in the torsional vibration damper characterized by the fact that the second sheet metal structural part 19, on the side of the second annular wall 71 which faces the first axis of rotation 1, forms an annular web 73 which leads axially away from the first sheet metal structural part 11, which annular web 73 connects the second annular wall 71 with a hub area 21 of the second sheet metal part 19, which hub area acts as a pivot bearing, that the hub area 21 carries a ring-shaped flywheel 27 which is located at some axial distance from the second annular wall 71, and that a third annular wall 39 of the first sheet metal structural part 3 extends radially, into the space which is axially between the second annular wall 71 and the flywheel 27 and forms the axial limit of the chamber 41 toward the flywheel 27.

A further feature of the invention resides broadly in the torsional vibration damper characterized by the fact that the third annular wall 39 overlaps the second annular wall 71, at least in a portion of its area, with an essentially parallel surface.

Another feature of the invention resides broadly in the torsional vibration damper characterized by the fact that the second 71b, 71c and the third 39b, 39c annular wall, in the vicinity of the inside periphery of the third annular wall 39b, 39c form an annular gap 95, 95c which becomes wider toward the radial inside.

Yet another feature of the invention resides broadly in the torsional vibration damper characterized by the fact that the annular gap 95c is formed by an encircling bead 93c of the third annular wall 39c, and the third annular wall 39c, on the side of the bead 93c closer to the first axis of rotation 1c, runs toward the second sheet metal structural part 19c.

Still another feature of the invention resides broadly in the torsional vibration damper characterized by the fact that the third annular wall 39c, in an area between the bead 93c and the first axis of rotation 1c, forms a dynamic seal 109 with the second sheet metal structural part 19c.

A further feature of the invention resides broadly in the torsional vibration damper characterized by the fact that the third annular wall 39 extends essentially to the annular web 73.

Another feature of the invention resides broadly in the torsional vibration damper characterized by the fact that the hub area 21b, 21c of the second sheet metal structural part 19b, 19c, radially between the annular web 73b, 73c and the flywheel 27b, 27c has a plurality of openings 97, 97c which are offset from one another in the peripheral direction, and that between the flywheel 27b, 27c and the third annular wall 39b, 39c, an annular gap 81b, 81c is formed which is open toward the radial outside.

Yet another feature of the invention resides broadly in the torsional vibration damper characterized by the fact that the third annular wall 39b, 39c extends with its inside periphery radially into the area between the annular web 73b, 73c and the openings 97, 97c, and in the vicinity of its inside periphery is bent axially away from the second annular wall 71b, 71c.

Still another feature of the invention resides broadly in the torsional vibration damper characterized by the fact that the annular web 73b is realized in the form of a sleeve or bushing which, on the side of the inertial mass bodies 57b next to the first axis of rotation 1b, overlaps axially with the teeth 65b of the inertial mass bodies 57b, and carries the mating teeth 67b.

A further feature of the invention resides broadly in the torsional vibration damper characterized by the fact that the sleeve extends to close up against the first sheet metal structural part 11b, and in particular forms a dynamic seal with the first sheet metal structural part 11b.

Another feature of the invention resides broadly in the torsional vibration damper characterized by the fact that a dynamic seal 109 is formed between the second sheet metal structural part 11c and the third annular wall 39b, in particular the radially inner edge of the third annular wall 39b.

Yet another feature of the invention resides broadly in the torsional vibration damper characterized by the fact that radially between the first axis of rotation 1a–d and the inertial mass bodies 57a–d, there is a dynamic seal 87, 91, 87c, 119 between the first 3a–d and the second 7a–d sheet metal structural part.

Still another feature of the invention resides broadly in the torsional vibration damper characterized by the fact that the dynamic seal comprises a sheet metal sealing part 119, which is screwed to the crankshaft, together with the first inertial mass system 3d, by means of the same screws 121.

A further feature of the invention resides broadly in the torsional vibration damper characterized by the fact that the teeth 65; 65a, 65c, 65d of the inertial mass bodies 57, 57a, 57c, 57d is closed axially, at least on one side.

Another feature of the invention resides broadly in the torsional vibration damper characterized by the fact that the second sheet metal structural part 19 and the third annular wall 39 are frictionally supported on one another, at least in a partial area.

Yet another feature of the invention resides broadly in the torsional vibration damper characterized by the fact that the inertial mass bodies 57 are mounted rotationally, and in particular cantilevered, by means of journals 59 on the first sheet metal structural part 11.

Still another feature of the invention resides broadly in the torsional vibration damper characterized by the fact that the journals 59d are formed in one piece, in particular stamped, on the first sheet metal structural part 11d.

A further feature of the invention resides broadly in the torsional vibration damper characterized by the fact that the inertial mass bodies 57d are provided over at least a portion of their periphery with teeth 65d which are concentric to the corresponding second axis of rotation 63d, in which teeth are engaged the mating teeth 67d of the other 7d of the two inertial mass systems 3d, 7d, which mating teeth 67d are concentric to the first axis of rotation 1d, as well as an additional mating teeth 115 of a ring-shaped inertial mass component 113 which can rotate relative to the first sheet metal structural part lid around the first axis of rotation, on diametrically opposite sides relative to the second axis of rotation 63d.

Another feature of the invention resides broadly in the torsional vibration damper characterized by the fact that the ring-shaped inertial mass component 115 is engaged in the teeth 65d of the inertial mass bodies 57d on the side of the inertial mass bodies 57d radially next to the first axis of rotation 1d.

Yet another feature of the invention resides broadly in the torsional vibration damper characterized by the fact that the inertial mass bodies 57a, 57c are located axially between annular walls 13a, 13c, 71a, 71c which run essentially radially and the second 7a, 7c inertial mass system, and are held by at least one axially acting spring 85, 85c, in particular a plate spring, in a frictional connection with at least one of these annular walls 13a, 13c, 71a, 71c.

Still another feature of the invention resides broadly in the torsional vibration damper characterized by the fact that the first 3 and the second 7 inertial mass systems have sheet metal structural parts 11, 19 which axially surround the inertial mass bodies 57 between annular walls 13, 71 which run essentially radially, and that the annular walls 13, 71 make a transition toward the first axis of rotation 1 into hub areas 15, 21, 23 in which the two inertial mass systems 3, 7 are mounted so that they can rotate radially relative to one another.

A further feature of the invention resides broadly in the torsional vibration damper characterized by the fact that the sheet metal structural parts 11, 19 have integral, coaxial bearing lugs 15, 23 which are engaged with one another, by means of which they are mounted on one another.

Another feature of the invention resides broadly in the torsional vibration damper characterized by the fact that the bearing lugs 15, 23 project axially toward on one another from the sheet metal structural parts 11, 19.

Yet another feature of the invention resides broadly in the torsional vibration damper characterized by the fact that the bearing is realized in the form of a plain bearing 5c and comprises a bearing ring 111, in particular one made of plastic.

Still another feature of the invention resides broadly in the torsional vibration damper characterized by the fact that the bearing ring 111 has an L-shaped cross section, and guides the sheet metal structural parts 11c, 19c both radially and axially in relation to one another.

A further feature of the invention resides broadly in the torsional vibration damper characterized by the fact that one of the sheet metal structural parts 11, 19, in particular the first sheet metal structural part 11, is provided with fastening means 17 for the attachment to the crankshaft of the internal combustion engine, and with its bearing lug 15, surrounds or encloses the bearing lug 23 of the other sheet metal structural part 19 from the radial outside.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A two-mass flywheel for use in a drive train of a motor vehicle, said two-mass flywheel comprising:

a first inertial mass system;

a second inertial mass system;

one of said first inertial mass system and said second inertial mass system being configured to be connected to a crankshaft of an internal combustion engine and the other of said first inertial mass system and said second inertial mass system being configured to be connected to a transmission system;

a connecting arrangement being configured and disposed to connect said first inertial mass system to said second inertial mass system;

a third inertial mass system;

said third inertial mass system comprising at least one rotatable inertial mass body;

a mounting arrangement to mount said at least one rotatable inertial mass body to permit said at least one rotatable inertial mass body to rotate;

a sole rotational arrangement being configured and disposed to engage said first rotatable inertial mass body to rotate said first rotatable inertial mass body;

said at least one rotatable inertial mass body being configured and disposed to solely engage with said rotational arrangement so as to permit said rotational arrangement to rotate said at least one rotatable inertial mass body; and said rotational arrangement being connected to one of said first inertial mass system and said second inertial mass system and configured to impart rotation from the connected one of said first inertial mass system and said second inertial mass system to said at least one rotatable inertial mass body.

2. The two mass flywheel according to claim 1, wherein:

said at least one rotatable inertial mass body comprises at least a first rotatable inertial mass body and a second rotatable inertial mass body;

said at least a first rotatable inertial mass body and a second rotatable inertial mass body are configured and disposed to be mounted on said mounting arrangement to permit said at least a first inertial mass body and a second rotatable inertial mass body to rotate;

said at least a first inertial mass body and a second rotatable inertial mass body are configured and disposed to be engaged by said rotational arrangement to rotate said at least a first rotatable inertial mass body and a second rotatable inertial mass body; and said rotational arrangement is connected to one of said first inertial mass system and said second inertial mass system and configured to impart rotation from the connected one of said first inertial mass system and said second inertial mass system to said at least a first rotatable inertial mass body and a second rotatable inertial mass body.

3. The two mass flywheel according to claim 1, wherein:

said at least one rotatable inertial mass body comprises a plurality of rotatable inertial mass bodies;

each of said plurality of rotatable inertial mass bodies is configured and disposed to be mounted on said mounting arrangement to permit each of said plurality of rotatable inertial mass bodies to rotate;

each of said plurality of rotatable inertial mass bodies is configured and disposed to be engaged by said rotational arrangement to rotate each of said plurality of rotatable inertial mass bodies;

said rotational arrangement is connected to one of said first inertial mass system and said second inertial mass system and configured to impart rotation from the connected one of said first inertial mass system and said second inertial mass system to each of said plurality of rotatable inertial mass bodies.

4. The two mass flywheel according to claim 3, wherein:

said first inertial mass system and said second inertial mass system have a substantially common first axis of rotation;

each of said plurality of inertial mass bodies has a corresponding axis of rotation;

said mounting arrangement is configured and disposed to mount each of said plurality of rotatable inertial mass bodies between said first inertial mass system and said second inertial mass system;

each of said plurality of rotatable inertial mass bodies comprises a cylindrical edge;

said cylindrical edge of each of said plurality of rotatable inertial mass bodies is disposed concentric to the corresponding axis of rotation of each of said plurality of rotatable inertial mass bodies;

said rotational arrangement comprises a first set of teeth;

said first set of teeth being disposed on at least a portion of said cylindrical edge of each of said plurality of rotatable inertial mass bodies;

said rotational arrangement comprises a second set of teeth;

said second set of teeth is disposed adjacent said first set of teeth;

said second set of teeth is disposed concentric to the first axis of rotation; and said second set of teeth is configured to engage with said first set of teeth to rotate each of said plurality of rotatable inertial mass bodies.

5. The two mass flywheel according to claim 4, comprises:

a first structural portion;

a second structural portion;

a first annular wall;

a second annular wall;

said first inertial mass system comprises said first structural portion;

said first structural portion is disposed substantially concentric to the first axis of rotation;

said first structural portion comprises said first annular wall;

said first annular wall is disposed substantially perpendicular to the first axis of rotation;

said first annular wall is substantially planar;

said second inertial mass system comprises said second structural portion;

said second structural portion is disposed substantially concentric to the first axis of rotation;

said second structural portion comprises said second annular wall;

said second annular wall is disposed substantially perpendicular to the first axis of rotation;

said second annular wall is substantially planar;

said second annular wall is disposed a substantial axial distance from said first annular wall; and at least a portion of each of said plurality of rotatable inertial mass bodies is disposed between said first annular wall and said second annular wall.

6. The two mass flywheel according to claim 5, wherein:

the first axis of rotation defines an axial direction substantially parallel to said first axis of rotation;

said two mass flywheel further comprises:

a first hub area;

a second hub area;

a first bearing lug;

a second bearing lug;

said first structural portion comprises said first hub area;

said first hub area comprises said first bearing lug;

said first bearing lug extends in the axial direction from said first structural portion toward said second structural portion;

said second structural portion comprises an annular web;

said annular web extends from said second annular wall toward the first axis of rotation;

said second structural portion comprises said second hub area;

said second hub area is connected to said annular web;

said second hub area comprises said second bearing lug;

said second bearing lug extends in the axial direction from said second structural portion toward said first structural portion;

said first bearing lug is disposed to cover at least a portion of said second bearing lug;

said first bearing lug is disposed a first distance from said first axis of rotation;

said second bearing lug is disposed a second distance from said first axis of rotation; and said first distance is greater than said second distance.

7. The two mass flywheel according to claim 6, further comprising:

a bearing arrangement to operatively connect said first bearing lug to said second bearing lug;

said bearing arrangement being disposed between said first bearing lug and said second bearing lug;

a flywheel portion;

said flywheel portion being attached to said second hub area;

said flywheel portion being configured to extend away from said second hub area in a substantially axial direction;

said flywheel portion being disposed a substantial axial distance from said second structural portion;

a chamber;

said chamber being disposed substantially concentric to the first axis of rotation;

said chamber being configured to contain a viscous medium;

said chamber being disposed a third distance from the first axis of rotation;

the axis of rotation of each of said plurality of rotatable inertial mass bodies being disposed a fourth distance from the first axis of rotation;

said third distance being greater than said fourth distance;

a third annular wall;

said first inertial mass system comprising said third annular wall;

said third annular wall being disposed between said flywheel portion and said second structural portion;

said third annular wall being substantially perpendicular to the first axis of rotation;

said third annular wall being configured to extend substantially to said annular web; and said third annular wall being disposed to cover at least a portion of said second annular wall.

8. The two mass flywheel according to claim 7, wherein:

said first inertial mass system comprises at least one hole to receive a bolt for connecting said first inertial mass system to a crankshaft of an internal combustion engine;

said first inertial mass system to be connected to a crankshaft of a motor vehicle;

said first connecting arrangement comprises a spring arrangement;

said spring arrangement is disposed in said chamber;

said first inertial mass system is operatively connected to said spring arrangement;

said second inertial mass system is operatively connected to said spring arrangement;

said spring arrangement comprises at least one coil compression spring;

said first structural portion comprises sheet metal;

said second structural portion comprises sheet metal;

said viscous medium is at least partially disposed in said chamber;

said viscous medium comprises grease;

each of said plurality of rotatable inertial mass bodies comprising:

a first end surface;

said first end surface being disposed substantially perpendicular to the first axis of rotation;

said first end surface being disposed adjacent to said first annular wall;

a second end surface;

said second end surface being disposed substantially perpendicular to said first axis of rotation;

said second end surface being disposed adjacent to said second annular wall; and at least one of said first annular wall and said second annular wall being disposed a minimal distance from the corresponding one of said first end surface and said second end surface;

said first inertial mass system comprising:

a first wall portion;

said first wall portion being connected to said first annular wall;

said first wall portion being substantially perpendicular to the first axis of rotation;

said first wall portion extending away from said first annular wall in a substantially radial direction;

a second wall portion;

said second wall portion being connected to said first wall portion;

said second wall portion being substantially perpendicular to said first wall portion; and said second wall portion extending in a substantially axial direction from said first wall portion toward said second inertial mass system;

said third annular wall is attached to said second wall portion; and said first wall portion, said second wall portion and said third annular wall are disposed to together define at least a portion of said chamber.

9. The two mass flywheel according to claim 8, wherein:

said annular web extends in a substantially axial direction from said second annular wall toward said first structural portion;

said second set of teeth is disposed on said annular web;

said second set of teeth is disposed a fifth distance from the first axis of rotation;

said fourth distance is greater than said fifth distance;

said annular web is configured to form a sleeve;

said two mass flywheel further comprises a first annular gap;

said first annular gap is disposed between said second annular wall and said third annular wall;

said third annular wall comprises an end portion;

said end portion is disposed opposite said second wall portion;

said end portion extends in a substantially axial direction away from said second structural portion;

said two mass flywheel further comprises a second annular gap;

said second annular gap is disposed between said third annular wall and said flywheel portion;

said second hub area comprises at least one opening;

said at least one opening is disposed between said annular web and said flywheel portion;

said at least one opening is disposed adjacent to said second annular gap;

said at least one opening is configured to permit passage of air into said second hub area;

said end portion is configured to deflect air entering said at least one opening into said second annular gap;

a sealing arrangement;

said sealing arrangement is disposed between said first structural portion and said second structural portion;

said sealing arrangement is disposed between said plurality of rotatable inertial mass bodies and said first bearing lug;

said annular web is at least a portion of said sealing arrangement;

said annular web is configured to form a dynamic seal between said first structural portion and said second structural portion;

said mounting arrangement is configured to mount each of said plurality of rotatable inertial mass bodies stationary with respect to said first inertial mass system;

said mounting arrangement comprises:
 a plurality of journals corresponding to said plurality of rotatable inertial mass bodies;
 a plurality of bearings corresponding to said plurality of rotatable inertial mass bodies;
 each of said plurality of bearings is rotatably mounted on a corresponding one of said plurality of journals;
 each of said plurality of journals is connected to said first structural portion; and
 each of said plurality of rotatable inertial mass bodies is disposed on a corresponding one of said plurality of bearings;

said first inertial mass system comprises a third wall portion;

said third wall portion extends from said second wall portion in a substantially axial direction; and said third wall portion axially extends beyond said flywheel portion.

10. The two mass flywheel according to claim 8, wherein:

said annular web extends in a substantially axial direction from said second annular wall away from said first structural portion;

said second set of teeth is disposed a fifth distance from the first axis of rotation;

said fifth distance is greater than said fourth distance;

each of said plurality of rotatable inertial mass bodies comprises a flange portion;

said flange portion of each of said plurality of rotatable inertial mass bodies is disposed concentric to the corresponding axis of rotation of each of said plurality of rotatable inertial mass bodies;

said flange portion of each of said plurality of rotatable inertial mass bodies is disposed adjacent to said first set of teeth;

said flange portion of each of said plurality of rotatable inertial mass bodies is disposed adjacent to said first end surface of each of said plurality of rotatable inertial mass bodies;

said flange portion of each of said plurality of rotatable inertial mass bodies is disposed at a first radius from the corresponding axis of rotation of each of said plurality of rotatable inertial mass bodies;

said first set of teeth is disposed at a second radius from the corresponding axis of rotation of each of said plurality of rotatable inertial mass bodies;

said first radius is greater than said second radius;

said flange portion has an axial thickness; and said flange portion comprises a solid piece to enclose said first set of teeth on said first end surface of each of said plurality of rotatable inertial mass bodies.

11. The two mass flywheel according to claim 10, wherein:

said second inertial mass system comprises a ring-shaped disc;

said ring-shaped disc is disposed between said first structural portion and said second structural portion;

said ring-shaped disc is disposed concentric to said first axis of rotation;

said ring-shaped disc is connected to said second structural portion;

said second set of teeth is disposed on said ring-shaped disc;

said ring-shaped disc comprises at least one arm portion;

said at least one arm portion is disposed in said chamber;

said ring-shaped disc and said second annular wall are disposed to form an annular pocket;

said annular pocket is disposed adjacent to said first set of teeth;

said first inertial mass system comprises a third wall portion;

said third wall portion extends from said second wall portion in a substantially axial direction; and said third wall portion extends axially beyond said flywheel portion.

12. The two mass flywheel according to claim 11, wherein:

at least a portion of said third annular wall is disposed to make frictional contact with at least a portion of said second structural portion;

said mounting arrangement is configured to mount said plurality of rotatable inertial mass bodies on said first inertial mass system;

said mounting arrangement comprising:
 a plurality of journals corresponding to said plurality of rotatable inertial mass bodies;
 a plurality of bearings corresponding to said plurality of rotatable inertial mass bodies;
 each of said plurality of bearings being rotatably mounted on a corresponding one of said plurality of journals;
 each of said plurality of journals being connected to said first structural portion; and
 each of said plurality of rotatable inertial mass bodies being disposed on a corresponding one of said plurality of bearings.

13. The two mass flywheel according to claim 12, further comprising:

said spring arrangement being a first spring arrangement;

a second spring arrangement;

said second spring arrangement being disposed between said plurality of rotatable inertial mass bodies and at least one of said first annular wall and said second annular wall;

said second spring arrangement being disposed to make frictional contact with said at least one of said first annular wall and said second annular wall;

said second spring arrangement comprising at least one plate spring;

a sealing arrangement;
said sealing arrangement being disposed between said first structural portion and said second structural portion;
said sealing arrangement being disposed between said plurality of rotatable inertial mass bodies and said first bearing lug;
said sealing arrangement comprising a sealing plate; and
said sealing plate being configured to form a dynamic seal between said first structural portion and said second structural portion.

14. The two mass flywheel according to claim 11, wherein:
each of said plurality of rotatable inertial mass bodies is configured to form a rolling body;
said spring arrangement is a first spring arrangement;
said mounting arrangement comprises a second spring arrangement;
said second spring arrangement is disposed between said rolling body and at least one of said first annular wall and said second annular wall;
said second spring arrangement is disposed to make frictional contact with said at least one of said first annular wall and said second annular wall;
said second spring arrangement comprises at least one plate spring;
said first inertial mass system comprises a guide track;
said guide track extends from said first inertial mass system toward said second inertial mass system in a substantially axial direction;
said guide track is disposed concentric to the first axis of rotation;
said guide track is disposed a sixth distance from said first axis of rotation;
said fourth distance is greater than said sixth distance; and
said guide track and said second toothing are configured to radially guide said rolling body.

15. The two mass flywheel according to claim 14, further comprising:
a first annular gap;
said first annular gap being disposed between said second annular wall and said third annular wall;
said third annular wall comprising an end portion;
said end portion being disposed opposite said second wall portion;
said end portion comprising a circular projection;
said circular projection being disposed adjacent to said second hub area;
said end portion and said second structural portion being disposed to form a dynamic seal between said second structural portion and said third annular wall;
a second annular gap;
said second annular gap being disposed between said third annular wall and said flywheel portion;
said second hub area comprising at least one opening;
said at least one opening being disposed between said annular web and said flywheel portion;
said at least one opening being configured to permit passage of air into said second hub area;
said at least one opening being disposed adjacent to said second annular gap;
said circular projection being configured to deflect air entering said at least one opening into said second annular gap;

a sealing arrangement;
said sealing arrangement being disposed between said first structural portion and said second structural portion;
said sealing arrangement being disposed between said rolling body and said first bearing lug;
said sealing arrangement being configured to form a dynamic seal between said first structural portion and said second structural portion;
said sealing arrangement comprising a sealing plate;
said guide track comprising a third set of teeth;
said third set of teeth being configured to mesh with said first set of teeth of said rolling body to radially guide said rolling body;
said bearing arrangement comprising a plain bearing;
said plain bearing comprising a bearing ring;
said bearing ring being configured to radially and axially guide said first structural portion and said second structural portion in relation to one another;
said bearing ring having an L-shaped cross-section; and
said bearing ring comprising a plastic material.

16. The two mass flywheel according to claim 10, further comprising:
a fourth inertial mass system;
said fourth inertial mass system being disposed between said first inertial mass system and said second inertial mass system;
said fourth inertial mass system being rotatable with respect to said first inertial mass system and said second inertial mass system about the first axis of rotation;
said fourth inertial mass system comprising an inertial mass component;
said inertial mass component being disposed concentric to the first axis of rotation;
said inertial mass component comprising an edge portion;
said edge portion being disposed concentric to the first axis of rotation;
said edge portion being disposed adjacent to said plurality of rotatable inertial mass bodies;
said inertial mass component comprising a third set of teeth;
said third set of teeth being disposed on said edge portion;
said third set of teeth being configured to engage said first set of teeth of each of said plurality of rotatable inertial mass bodies to rotate said inertial mass component about the first axis of rotation upon rotation of said plurality of inertial mass bodies; and
said third set of teeth being disposed opposite said second set of teeth about each of said plurality of rotatable inertial mass bodies.

17. The two mass flywheel according to claim 16, wherein:
said third set of teeth is disposed a sixth distance from the first axis of rotation;
said fourth distance is greater than said sixth distance;
said first inertial mass system comprises a sealing arrangement;
said sealing arrangement is connected to said first structural portion;
said sealing arrangement is disposed between said first structural portion and said second structural portion;

said sealing arrangement is disposed between said plurality of rotatable inertial mass bodies and said first bearing lug;

said sealing arrangement is configured to form a dynamic seal between said first structural portion and said second structural portion;

said sealing arrangement comprises a sheet metal sealing part;

said sheet metal sealing part comprises an annular shoulder;

said annular shoulder is disposed adjacent to said second structural portion;

said annular shoulder is disposed parallel to the first axis of rotation;

said inertial mass component is disposed on said annular shoulder;

said third set of teeth is disposed at a third radius from the corresponding axis of rotation of each of said plurality of rotatable inertial mass bodies;

said first radius is greater than said third radius;

said solid piece of said flange portion is disposed to enclose said third set of teeth on said first end surface of each of said plurality of rotatable inertial mass bodies;

at least a portion of said third annular wall is disposed to make frictional contact with at least a portion of said second structural portion;

said mounting arrangement is configured to mount each of said plurality of rotatable inertial mass bodies stationary with respect to the first inertial mass system;

said mounting arrangement comprises:
- a plurality of journals corresponding to said plurality of rotatable inertial mass bodies;
- a plurality of bearings corresponding to said plurality of rotatable inertial mass bodies;
- each of said plurality of bearings is rotatably mounted on a corresponding one of said plurality of journals;
- said plurality of journals and said first structural portion comprise a single homogeneous piece; and
- each of said plurality of rotatable inertial mass bodies is disposed on a corresponding one of said plurality of bearings;

said third annular wall and said flywheel portion are disposed to form an annular gap;

said flywheel portion comprises a plurality of ribs;

said plurality of ribs is disposed adjacent to said second hub area;

said plurality of ribs is configured to form at least one air channel for the passage of exterior air into said annular gap; and said at least one air channel is connected to said annular gap.

18. The two mass flywheel according to claim 1, wherein said mounting arrangement is connected to the one of said first inertial mass system and said second inertial mass system not connected to said rotational arrangement.

19. The two mass flywheel according to claim 1, wherein:

said at least one rotatable inertial mass body comprises additional rotatable inertial mass bodies;

each of said rotatable inertial mass bodies is configured and disposed to be mounted on said mounting arrangement to permit each of said rotatable inertial mass bodies to rotate;

each of said rotatable inertial mass bodies is configured and disposed to be engaged by said rotational arrangement to rotate each of said rotatable inertial mass body;

said rotational arrangement is connected to one of said first inertial mass system and said second inertial mass system and configured to impart rotation from the connected one of said first inertial mass system and said second inertial mass system to said first rotatable inertial mass body and said additional rotatable inertial mass bodies.

20. The two mass flywheel according to claim 19, wherein said mounting arrangement is connected to the one of said first inertial mass system and said second inertial mass system not connected to said rotational arrangement.

* * * * *